United States Patent

Scharpf

[11] Patent Number: 5,842,345
[45] Date of Patent: Dec. 1, 1998

[54] HEAT RECOVERY AND POWER GENERATION FROM INDUSTRIAL PROCESS STREAMS

[75] Inventor: Eric William Scharpf, Surrey, England

[73] Assignee: Air Products and Chemicals, Inc., Allentown, Pa.

[21] Appl. No.: 938,473

[22] Filed: Sep. 29, 1997

[51] Int. Cl.⁶ .................................. F01K 25/06
[52] U.S. Cl. ............................. 60/649; 423/237
[58] Field of Search .................. 60/649, 655, 673; 423/237

[56] References Cited

U.S. PATENT DOCUMENTS

| | | | |
|---|---|---|---|
| 4,183,218 | 1/1980 | Eberly, Jr. | 60/673 |
| 4,195,485 | 4/1980 | Brinkerhoff | 60/649 |
| 4,295,335 | 10/1981 | Brinkerhoff | 60/673 |
| 4,422,297 | 12/1983 | Rojey | 60/651 |
| 4,489,563 | 12/1984 | Kalina | 60/673 |
| 4,548,043 | 10/1985 | Kalina | 60/673 |
| 4,573,321 | 3/1986 | Knaebel | 60/649 |
| 4,586,340 | 5/1986 | Kalina | 60/673 |
| 4,604,867 | 8/1986 | Kalina | 60/653 |
| 4,622,820 | 11/1986 | Sundquist | 60/673 |
| 4,732,005 | 3/1988 | Kalina | 60/673 |
| 4,756,162 | 7/1988 | Dayan | 60/673 |
| 4,763,480 | 8/1988 | Kalina | 60/649 |
| 4,779,424 | 10/1988 | Sumitomo et al. | 60/649 |
| 4,819,437 | 4/1989 | Dayan | 60/673 |
| 4,848,088 | 7/1989 | Lazarevich | 60/673 |
| 4,899,545 | 2/1990 | Kalina | 60/673 |
| 4,982,568 | 1/1991 | Kalina | 60/649 |
| 5,007,240 | 4/1991 | Ishida et al. | 60/673 |
| 5,029,444 | 7/1991 | Kalina | 60/673 |
| 5,095,708 | 3/1992 | Kalina | 60/673 |

*Primary Examiner*—Noah P. Kamen
*Attorney, Agent, or Firm*—John M. Fernbacher

[57] ABSTRACT

Work is recovered from a first process stream in a high temperature range by heating and vaporizing a condensate-containing mixed component working fluid, expanding the vapor in an expansion turbine to generate work, and condensing the turbine exhaust by indirect heat exchange with a second process stream in a low temperature range to provide the condensate-containing mixed component working fluid. The composition of the working fluid is changed in response to a change in the high temperature range, a change in the low temperature range, or changes in both temperature ranges in order to maintain the efficiency of the work recovery step. The working fluid can be a mixture of ammonia and water. The first and second process streams can be process streams in a combined cycle power generation system or an ammonia synthesis plant.

12 Claims, 5 Drawing Sheets

HEAT RECOVERY AND POWER GENERATION FROM INDUSTRIAL PROCESS STREAMS

BACKGROUND OF THE INVENTION

Heat can be recovered from a high temperature source and converted into work utilizing the well-known Rankine cycle. The heat is extracted from a high temperature heat source, for example a combustion exhaust gas stream, into a working fluid. The working fluid, which is initially liquid, is evaporated and the resulting pressurized working fluid vapor passes into an expansion turbine where work is generated to recover at least some of the heat energy extracted from the high temperature source. By using very high temperatures for the heat source and very low temperatures for the heat sink, high efficiency can be achieved for the heat recovery step.

The expansion turbine vapor exhaust, which is at a reduced temperature and pressure, passes to a condenser which is in thermal contact with a low temperature heat sink, typically a very large body of water or ambient air. The heat of condensation is rejected to the low temperature heat sink typically by cooling water, which is discharged into a large body of water or into the atmosphere by means of a cooling tower. Alternatively, air cooling is used with the heated air being discharged directly into the atmosphere. The ultimate heat sink remains at an essentially constant temperature relative to the thermal load rejected by condensation of the turbine exhaust. The heat thus rejected is not used for any beneficial purpose and cannot be utilized within the process which provides the source of the high temperature heat.

In most circumstances, the working fluid is a single component such as water, for example in the well-known recovery of heat and power from a combustion turbine exhaust or other high temperature gas streams. However, it can be advantageous to use a mixed component working fluid having two or more components, as the mixed component working fluid vaporizes and condenses progressively over a temperature range rather than at the relatively constant temperature of a pure component. For example, it is known to use a mixture of water and ammonia as a mixed component working fluid.

U.S. Pat. No. 4,422,297 discloses a mixed component power generation cycle which uses a mixture of hydrocarbons or a mixture of ammonia and water as the working fluid. The heat sink employed for condensation is a cooling fluid such as water or air and thus the heat of condensation is rejected to an essentially constant temperature heat sink. Various boundary conditions for the ranges of temperature for the heat source, the working fluid and the heat sink in order to maximize the efficiency of the power generation step are specified.

U.S. Pat. No. 4,779,424 discloses a similar heat recovery system using a non-azeotropic mixture as the working fluid. After extracting energy from the working fluid by work expansion in a steam turbine, residual heat in the working fluid is rejected to a cooling water stream.

Other patents which disclose similar systems and summarize the state of the art include U.S. Pat. Nos. 5,007,240; 4,848,088; 4,819,437; 4,756,162; 4,622,820; 4,573,321; 4,307,572; 4,295,335; 4,195,485; and 4,183,218. The use of mixed working fluids is disclosed in U.S. Pat. Nos. 5,095,708; 5,029,444; 4,982,568; 4,899,545; 4,763,480; 4,732,005; 4,604,867; 4,586,340; 4,548,043; and 4,489,563.

The prior art typically discloses power generation or heat recovery systems in which heat from the working fluid is rejected to a sink at an essentially constant low temperature. Such heat sinks typically are ambient air or large bodies of water. The emphasis in these prior art patents is on maximizing the efficiency of the power generation step by having the heat source at as high a temperature as possible and having the heat sink at as low a temperature as possible, in accordance with standard known thermodynamic principles. Since heat is rejected directly to the ambient temperature sink, the heat cannot be reused in the process.

The methods and apparatus disclosed in these prior art patents typically have complex multi-stage evaporators and/or condensers, for example, or have very complicated systems for controlling the composition of the multi-component working fluid. These prior art methods require complicated arrangements of heat exchangers, separators, distillation columns, absorption condensers, and multiple pressure turbine systems in order to provide efficient power generation. Such methods are expensive, however, and thus have been used mostly in large dedicated power generation plants. Furthermore, while power generation may be efficient in these prior art systems, there is incomplete heat recovery, because the heat of condensation of the working fluid is typically rejected directly to cooling water and/or ambient air without further beneficial use.

Methods to recover heat from high temperature sources, convert a portion of such heat into useful work, and reject residual heat for further use at lower temperatures can be beneficial in the power generation and chemical process industries. The method described in the following specification and defined in the appended claims allows the recovery and use of process heat in this manner.

BRIEF SUMMARY OF THE INVENTION

The object of the present invention is to provide a method for recovering heat from a process by utilizing a mixed working fluid, extracting useful work from the fluid by expansion to a lower temperature and pressure, and utilizing the residual heat contained in the resulting cooled working fluid elsewhere in the process. The composition of the mixed working fluid is changed in response to changes in the higher temperature range in which heat is recovered from the process and/or in the lower temperature range in which heat is returned to the process. In one embodiment, the method is applied to a combined cycle power generation system, and in another embodiment is applied to a process for ammonia synthesis.

In the broadest embodiment, the invention is method of recovering work from a process having at least a first and a second process stream which comprises:

(1) transferring heat in a first heat exchange zone in a first temperature range from the first process stream to a selected working fluid comprising at least two components to yield a heated and pressurized vapor-containing working fluid at a first temperature, and a cooled first process stream, wherein the selected working fluid has a given composition;

(2) work expanding the heated and pressurized vapor-containing working fluid in an expansion turbine to generate work, and withdrawing therefrom a cooled expanded working fluid;

(3) transferring heat from the cooled expanded working fluid to the second process stream in a second heat exchange zone in a second temperature range which is lower than the first temperature range, thereby heating the second process stream and condensing at least a portion of the cooled expanded working fluid to yield a condensate-containing working fluid;

(4) returning the condensate-containing working fluid to the first heat exchange zone to provide the selected working fluid of step (1); and (5) changing the given composition of the selected working fluid in response to a change in the first temperature range, a change in the second temperature range, or changes in both the first and second temperature ranges.

The selected working fluid can comprise two components, the first component of which has a higher vapor pressure than the second component. The composition of this selected working fluid can be changed in response to an increase in the second temperature range by decreasing the ratio of the first component to the second component. Alternatively, the composition of the selected working fluid can be changed in response to a decrease in the second temperature range by increasing the ratio of the first component to the second component. The selected working fluid can comprise ammonia and water.

The first process stream preferably is cooled by at least 40° F. in step (1) in the first heat exchange zone. In addition, the first process stream preferably is cooled from a temperature of less than 1000° F. to a temperature of greater than 20° F. in step (1) in the first heat exchange zone. The second process stream preferably is heated by at least 40° F. in step (3) in the second heat exchange zone. Further, the second process stream preferably is heated from a temperature of greater than –60° F. to a temperature of less than 400° F. in step (3) in the second heat exchange zone.

In one embodiment, the process is a combined cycle power generation process in which heat is recovered from a gas turbine exhaust stream by vaporizing a water condensate stream by indirect heat exchange with the exhaust stream to generate steam, expanding the steam in one or more expansion turbines to drive an electric generator, withdrawing a cooled expanded water stream from a final expansion turbine, and condensing the cooled expanded water stream to provide a portion of the water condensate stream. In this embodiment, the first process stream is the hot gas turbine exhaust stream and the second process stream is a portion of the water condensate stream.

The pressure of the gas turbine exhaust stream can be controlled by changing the composition of the selected working fluid in response to changes in the second temperature range.

In another embodiment of the invention, the process is an ammonia synthesis process which comprises:

(a) heating and saturating a natural gas feed, wherein the natural gas feed is saturated by direct contact with a stream of hot saturator feed water to yield a heated and saturated natural gas feed and a stream of cooled saturator discharge water;

(b) subjecting the heated and saturated natural gas feed to primary reforming and secondary reforming steps to produce an intermediate synthesis gas comprising carbon monoxide and hydrogen;

(c) converting a portion of the carbon monoxide in the intermediate synthesis gas to hydrogen and carbon dioxide in a high temperature water-gas shift reactor to yield a high temperature intermediate shift gas; and (d) cooling the high temperature intermediate shift gas and introducing the resulting cooled gas into a low temperature water-gas shift reactor to yield raw ammonia synthesis gas which is further treated and reacted catalytically to yield an ammonia product.

In this embodiment, the first process stream is the high temperature intermediate shift gas and the second process stream is the cooled saturator discharge water.

DETAILED DESCRIPTION OF THE INVENTION

The invention is a method of recovering work from a process by heating and evaporating a mixed component working fluid in a high temperature range by indirect heat exchange with a first process stream, expanding the vapor in an expansion turbine to generate work, and condensing the turbine exhaust by indirect heat exchange with a second process stream in a low temperature range. The condensed mixed component working fluid is returned and again heated by the first process stream in the high temperature range, and the closed cycle heat recovery step is repeated. The composition of the working fluid is changed in response to a change in the high temperature range, a change in the low temperature range, or changes in both temperature ranges in order to maintain the efficiency of the work recovery step.

The invention is characterized by three desirable process features as described below. First, the evaporation and condensation of the mixed component working fluid occur over temperature ranges, and the corresponding heat exchange occurs over these ranges as a result of the multi-component evaporation and condensation temperature profiles. Second, the composition of the mixed component working fluid can be varied as required. Third, the heat rejected in the lower temperature range is utilized in the process rather than discharged directly to an ambient heat sink.

Figure 1:
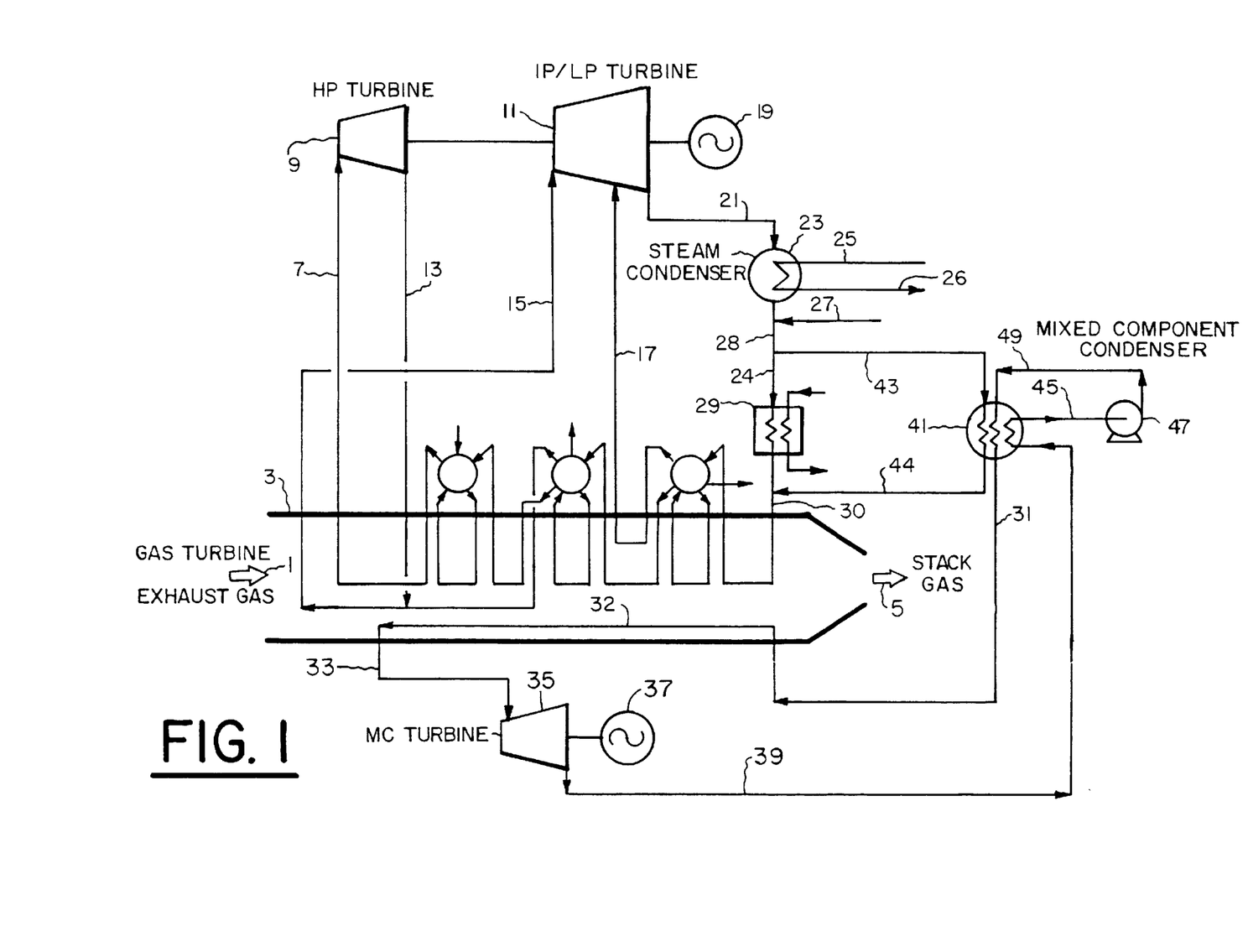
FIG. 1 is a schematic representation of a system and method according to a first embodiment of the present invention.

FIG. 1 is a schematic flow diagram of a heat recovery system of the present invention as applied to a combined cycle power generation system. In this embodiment, exhaust gas 1 from the gas turbine (not shown) passes through heat recovery steam generator 3 and is cooled to yield stack gas 5 at a substantially reduced temperature. Heat from gas turbine exhaust gas 1 is recovered in a series of steam coils by known methods in heat recovery steam generator 3 to produce high pressure superheated steam in line 7, which is expanded to generate work in high pressure turbine 9. Exhaust gas in line 13 is reheated in heat recovery steam generator 3 to yield intermediate pressure steam in line 15, which is expanded in intermediate/low pressure turbine 11. Low pressure steam in line 17 is generated in heat recovery steam generator 3 and introduced into intermediate/low pressure turbine 11 at an interstage location. The high pressure and intermediate/low pressure turbines operate on a common drive shaft to operate electric generator 19.

Exhaust steam in line 21 is cooled in condenser 23 by cooling water in line 25 and supplemented with makeup water in line 27. The combined stream optionally is heated by low level process heat in exchanger 29 to yield water condensate in line 30 for generating steam in heat recovery steam generator 3 as described above.

The present invention recovers additional heat from exhaust gas 1 in heat recovery steam generator 3 and produces additional power. Mixed component working fluid in line 31, initially in the condensed state, passes through a heat transfer coil or evaporator 32 in heat recovery steam generator 3 and is vaporized to provide high pressure vapor in line 33. This vapor is expanded through mixed component expansion turbine 35 which drives electric generator 37. Turbine exhaust in line 39 is cooled and condensed in mixed component condenser 41 against water condensate in line 43, which is a portion of water condensate 28 earlier described.

Condensed mixed working fluid in line 45 is pressurized in pump 47 and the pressurized working fluid in line 49 is partially rewarmed in mixed component condenser 41 to provide rewarmed mixed component liquid in line 31 which provides mixed component working fluid to evaporator 32 as earlier described. Alternatively, pressurized stream 49 can pass directly to evaporator 32 in heat recovery steam generator 3, which simplifies the design of mixed component condenser 41 with only a marginal efficiency loss.

An advantage of the present invention is that it can easily be retrofitted to an existing steam turbine system. Operation of heat recovery steam generator 3 does not affect the reliability of the base power plant since the main steam turbines 9 and 11 can continue to operate even if the heat recovery system of the present invention is taken off line.

Warmed water condensate in line 44 from mixed component condenser 41 is combined with warmed condensate from optional heat exchanger 29 to yield water condensate in line 30 for generating steam in heat recovery steam generator 3 as earlier described. Thus the heat of condensation of mixed working fluid in line 39 is recovered by water condensate in line 43 in mixed component condenser 41 and returned to the process via warmed water condensate in line 44. This reduces the amount of heat which is rejected from the overall process in cooling water 26 and increases the overall power generation efficiency of the system of FIG. 1.

Working fluid 31 utilized in the closed cycle heat recovery system described above preferably is a mixture of ammonia and water, although other components may be used if desired. The mixed working fluid composition is selected such that heat is recovered most efficiently from gas turbine exhaust gas 1 and that expansion turbine 35 is operated in the most efficient range.

The specific composition of the working fluid will depend upon the temperature range over which heat is recovered in evaporator 32 and/or the temperature range over which heat is rejected in mixed component condenser 41. A change can occur in either or both of these temperature ranges because of a change in (1) the temperature of gas turbine exhaust gas 1 and/or (2) a change in the temperature of water condensate in line 43. According to the present invention, the composition of the working fluid is changed in response to changes in these temperature ranges in order to maintain the overall power generation efficiency of the system of FIG. 1. The working fluid composition preferably is changed to maintain a selected process variable at a constant value, for example by maintaining the discharge pressure of expansion turbine 35 at a constant value.

Since the mixed component working fluid is contained in a closed-loop system, the composition of the fluid can be changed readily by withdrawing a predetermined amount of mixed fluid from the system and introducing a calculated amount of the appropriate pure component fluid into the system. During steady state operation, i.e. when the temperature ranges of the working fluid in evaporator 32 and condenser 41 are essentially constant, the bulk composition of the mixed component working fluid inventory in the closed-loop system is essentially constant. Likewise, under these conditions the overall composition of the working fluid at any point in the closed-loop system is essentially constant. The recirculating mixed component working fluid is utilized in a single process stream, and separation or purification of the stream into one or more streams is not part of the system operation. The flow rate of the recirculating working fluid will depend on the amount of process heat available, which will depend for example on the flow rate of exhaust gas 1 in FIG. 1.

Figure 2:
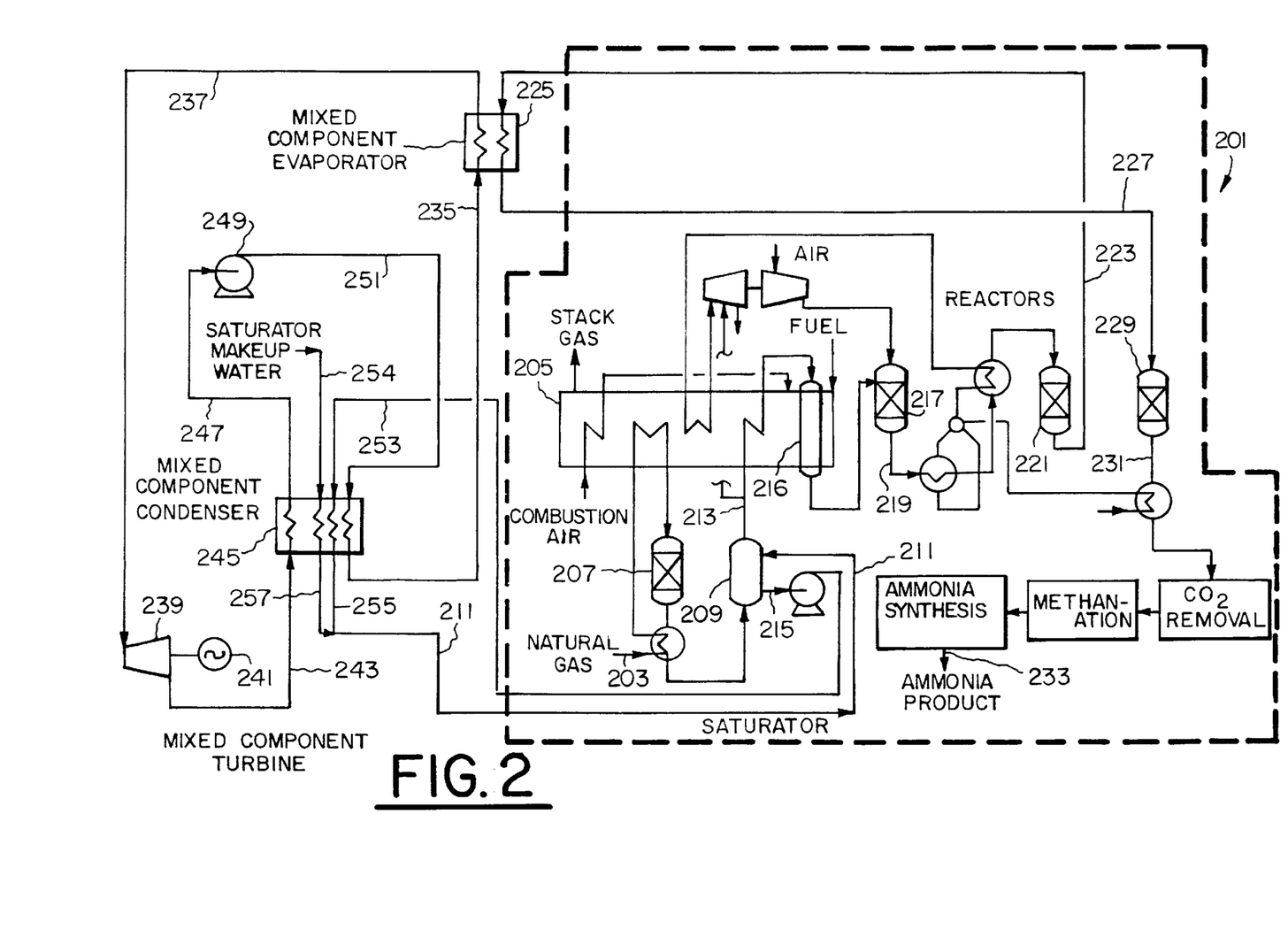
FIG. 2 is a schematic illustration of a system and method according to a second embodiment of the present invention.

An alternative embodiment of the invention is shown on FIG. 2 in which heat is recovered from process streams in ammonia synthesis system 201. In this well-known process, natural gas in line 203 is heated in reformer furnace 205, desulfurized in reactor 207, and introduced into direct contact saturator 209. Hot saturator feed water in line 211 is contacted with the natural gas to yield saturated natural gas in line 213 and cooled saturator discharge water 215. Saturated natural gas in line 213 is further heated in reformer furnace 205, and then is subjected to catalytic reforming in primary reformer 216 and secondary reformer 217 to produce intermediate synthesis gas in line 219.

Intermediate synthesis gas in line 219 is cooled and a portion of the carbon monoxide in this stream is converted to hydrogen and carbon dioxide in high temperature water-gas shift reactor 221 to yield high temperature intermediate shift gas in line 223. This stream is cooled in mixed component evaporator 225 (later described) and the resulting cooled intermediate shift gas in line 227 is further reacted in low temperature water-gas shift reactor 229 to yield raw synthesis gas in line 231 which is cooled, further processed, and reacted catalytically to yield ammonia product in line 233.

The present invention recovers heat contained in high temperature intermediate shift gas in line 223 by heat exchange in mixed component evaporator 225 with mixed component condensed working fluid in line 235. The condensed working fluid is vaporized therein to produce mixed component vapor in line 237 and cooled intermediate shift gas in line 227, which is further reacted in low temperature water-gas shift reactor 229 as earlier described. Mixed component vapor in line 237 is expanded through expansion turbine 239 to generate work which drives generator 241. Expansion turbine exhaust vapor in line 243 is cooled and condensed in mixed component condenser 245, mixed condensate in line 247 is pressurized in pump 249, and pressurized mixed condensate 251 optionally is warmed to provide mixed component condensed working fluid in line 235.

Cooling duty for the condensation of expansion turbine exhaust vapor 243 is provided by pressurized cooled saturator discharge water 253, which is obtained by pumping cooled saturator discharge water in line 215 earlier described. The resulting heated water in line 255 is combined with heated makeup water in line 257 to provide hot saturator feed water in line 211. Thus in this embodiment of the invention heat is recovered from high temperature intermediate shift gas in line 223 by the mixed component working fluid which is expanded to generate power, and the heat of condensation of the expanded working fluid is returned and used in direct contact saturator 209 via hot saturator feed water in line 211.

Working fluid in line 235 utilized in the closed cycle heat recovery system described above preferably is a mixture of ammonia and water, although other components may be used if desired. The mixed working fluid composition is selected such that heat is recovered most efficiently from high temperature intermediate shift gas in line 223 and that expansion turbine 239 is operated in the most efficient range.

The specific composition of the working fluid will depend upon the temperature range over which heat is recovered in evaporator 225 and/or the temperature range over which heat is rejected in mixed component condenser 245. A change can occur in either or both of these temperature ranges because of (1) a change in the temperature of high temperature intermediate shift gas in line 223 and/or (2) a change in the temperature of cooled saturator discharge water in line 253 and/or (3) a change in the temperature of saturator makeup water in line 254. According to the present invention, the composition of the working fluid is changed in response to changes in these temperature ranges in order to maintain the overall power generation efficiency of the system of FIG. 2. The working fluid composition preferably is changed to maintain a selected process variable at a constant value, for example by maintaining the discharge pressure of expansion turbine 239 at a constant value.

Since the mixed component working fluid is contained in a closed-loop system, the composition of the fluid can be changed readily by withdrawing a predetermined amount of mixed fluid from the system and introducing a calculated amount of the appropriate pure component fluid into the system. During steady state operation, i.e. when the temperature ranges of the working fluid in evaporator 225 and condenser 245 are essentially constant, the bulk composition of the mixed component working fluid inventory in the closed-loop system is essentially constant. Likewise, under these conditions the overall composition of the working fluid at any point in the closed-loop system is essentially constant. The recirculating mixed component working fluid is utilized in a single process stream, and separation or purification of the stream into one or more streams is not part of the system operation. The flow rate of the recirculating working fluid will depend on the amount of process heat available, which will depend for example on the flow rate of intermediate synthesis gas in line 223 of FIG. 2.

EXAMPLE 1

Process heat and material balances were computed for the steam turbine cycle of FIG. 1 operated without the mixed component heat recovery and expansion turbine system of the present invention to establish the base case performance of the steam cycle. Gas turbine exhaust gas 1 is obtained from the gas turbine section of a 192 MW gasification combined cycle power generation system operating on synthesis gas produced by a coal gasification system (not shown). Gas turbine exhaust gas 1 at 3,828,000 lb/hr contains 67.1% nitrogen+argon, 12% oxygen, 7.3% carbon dioxide, and 13.7% water (all mole %) at 15.2 psia and 1105° F. Key operating conditions include an ambient temperature of 59° F. at 60% relative humidity, a temperature of 250° F. in stack gas 5, a temperature of 92° F. for makeup water 27, steam condenser 23 duty of 724.1 million BTU/hr, and low level process heat provided to exchanger 29 at 48.8 million BTU/hr. Water condensate 30 is provided to heat recovery steam generator 3 at 151° F. and 832,000 lb/hr. Selected amounts of steam and boiler feedwater are exchanged with the gas turbine combustor and coal gasification system (not shown). High, intermediate, and low pressure steam in lines 7, 15, and 17 are generated and expanded through expansion turbines 9 and 11 as earlier described to generate a total turbine output of 163,040 hp.

EXAMPLE 2

Process heat and material balances were computed for the steam turbine cycle of FIG. 1 including the mixed component heat recovery and expansion turbine system of the present invention. The same process parameters of Example 1 for gas turbine exhaust gas stream 1 and stack gas 5 are utilized. The key operating parameters of the mixed component heat recovery system are as follows: mixed component working fluid in line 39 at a recirculation rate of 40,000 lb/hr and a composition of 47 mole % ammonia and 53 mole % water; mixed component working fluid in line 33, the inlet to expansion turbine 35, at 1,500 psia and 770° F.; expansion turbine 35 outlet fluid in line 39 at 70 psia and 266° F.; water condensate in line 30 to heat recovery steam generator 3 at 193° F. and 880,000 lb/hr; water condensate in line 43 to mixed component condenser 41 at 325,000 lb/hr; water condensate in line 24 to exchanger 29 at 555,000 lb/hr; and mixed component condenser outlet line 31 at 190° F. Because the temperature of water condensate in line 30 is higher in Example 2 than in Example 1, the flow rates of steam in lines 15 and 17 are slightly changed. Other key operating parameters of the steam generating and steam turbine system are the same as Example 1.

The system of FIG. 2 operated as described above generates a total turbine output of 163,886 hp—160,482 total from steam expansion turbines 9 and 11, and 3,404 from mixed component expansion turbine 35. The total of turbine output of 163,886 hp of Example 2 is 0.52% higher than the 163,040 hp of Example 1, and this increase is due to the higher overall efficiency of the system using the present invention.

EXAMPLE 3

Process heat and material balances were computed for the ammonia plant integrated with a heat recovery/expansion turbine system as shown FIG. 2. Pure water is used as the working fluid in this Example to illustrate low level heat recovery in general and to compare the performance of pure and mixed component working fluids in the same heat recovery application. The ammonia plant has a nominal capacity of 1,100 metric tons/day. High temperature intermediate shift gas in line 223, containing 38% hydrogen, 36% water, 10% carbon dioxide, 13% nitrogen, 2% carbon monoxide, and 1% methane (all mole %) is provided at 806° F., 400 psia, and 300,000 lb/hr flow. Evaporator 225 transfers 72.1 million BTU/hr to water condensate in line 235, which is provided directly from condensate pump 249 without warming in condenser 245. Steam in line 237, which is generated at 648° F., 505 psia, and 67,000 lb/hr flow, is expanded through six stage condensing turbine 239 to generate 4,347 hp to drive generator 241.

Turbine exhaust in line 243, produced at 284° F. and 52 psia, is condensed in condenser 245 to provide condensate in line 247 to pump 249. Condenser 245 provides 413,000 lb/hr of hot saturator feed water in line 211 at 271° F. and 400 psia with a condenser heat duty to saturator 204 of 61.2 million BTU/hr. Saturator makeup water in line 254 and pressurized cooled saturator discharge water in line 253 are provided at 173,000 and 240,000 lb/hr respectively.

Figure 3:
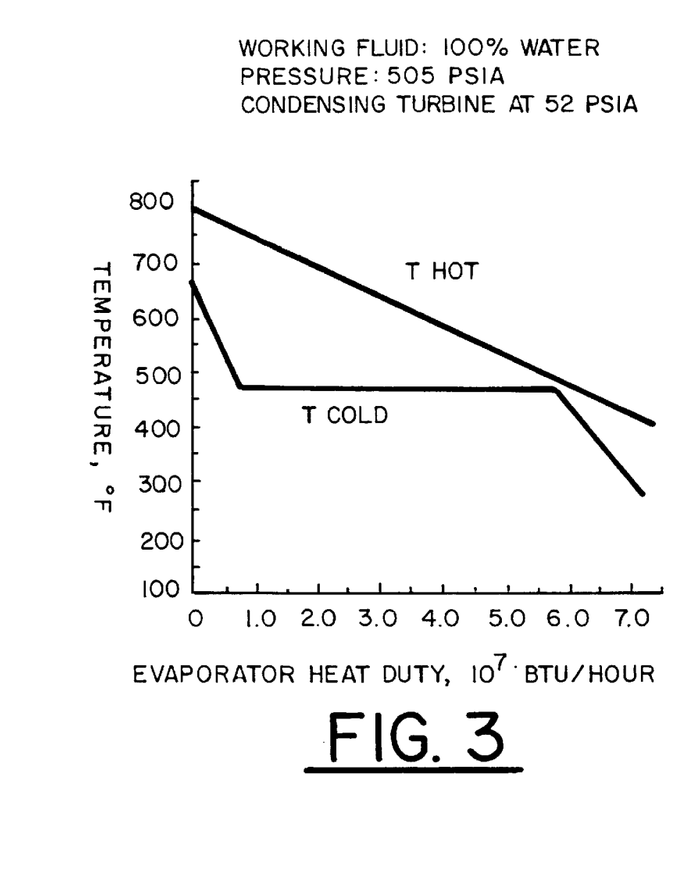
FIG. 3 is a graph showing the evaporator temperature profiles for an integrated system using water as a single component working fluid.
Figure 4:
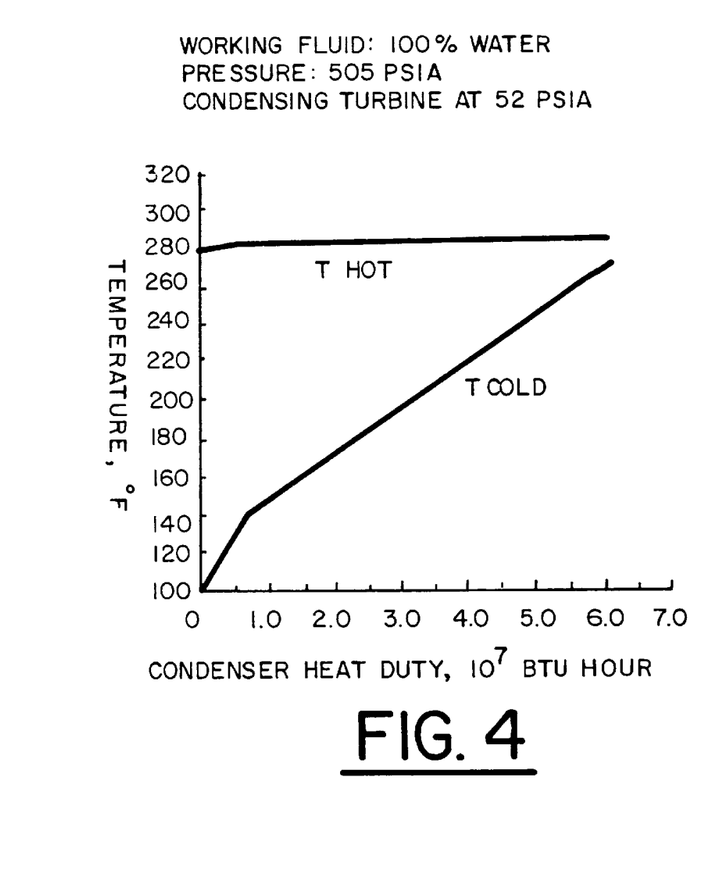
FIG. 4 is a graph showing the condenser temperature profiles for an integrated system using water as a single component working fluid.

The temperature profiles of the heating and cooling streams in evaporator 225 are shown in FIG. 3, and profiles in condenser 245 are shown in FIG. 4.

EXAMPLE 4

Process heat and material balances were computed for the ammonia plant of Example 3 integrated with the heat recovery/expansion turbine system as shown FIG. 2. The heat recovery/expansion turbine system uses a mixed component working fluid containing 27 mole % ammonia and 73 mole % water. High temperature intermediate shift gas in line 223 is provided from the ammonia synthesis system at the same conditions as Example 3, and evaporator 225 transfers the same 72.1 million BTU/hr to condensate 235 as in Example 3. Vaporized mixed component fluid in line 237 at 785° F., 900 psia, and 66,000 lb/hr is expanded across six stage non-condensing turbine 239 to generate 5,309 hp to drive generator 241.

Turbine exhaust 243, produced at 316° F. and 58 psia, is condensed in condenser 245 to provide condensate 247 to pump 249. Pressurized condensate 251 is warmed in condenser 245 to provide condensate 235 at 265° F. and 910 psia. This increases power generation efficiency by recycling some heat internally by preheating pressurized condensate 251 against condensing low pressure working fluid vapor 243. Condenser 245 provides 413,000 lb/hr of hot saturator feed water 211 at 265° F. and 400 psia with a condenser heat duty to saturator 209 of 59.1 million BTU/hr. Saturator makeup water 254 and pressurized cooled saturator discharge water 253 are provided at 173,000 and 240,000 lb/hr respectively as in Example 3.

Figure 5:
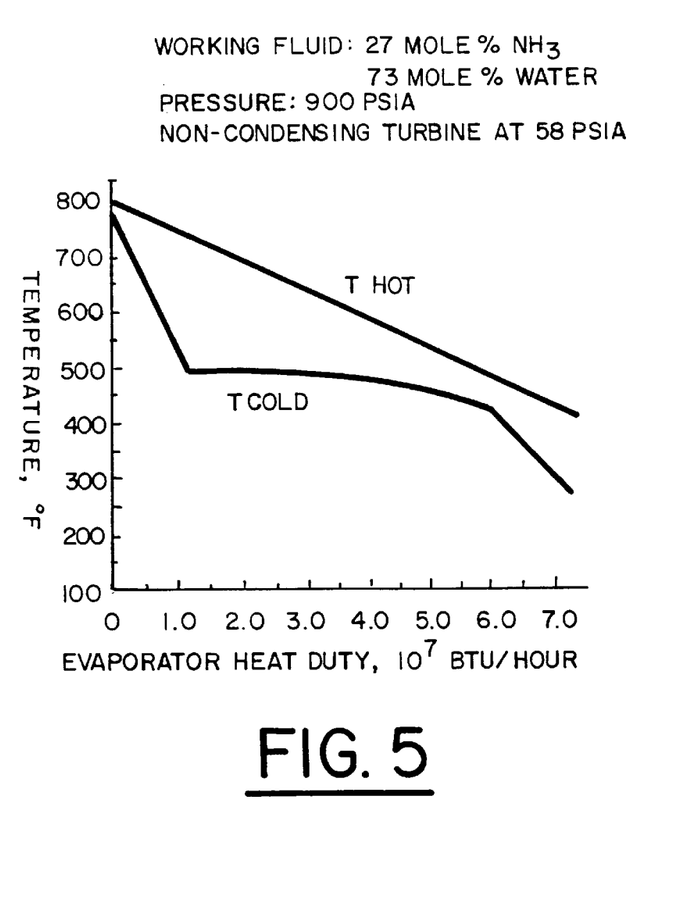
FIG. 5 is a graph showing the evaporator temperature profiles for an integrated system using a mixed ammonia-water working fluid.
Figure 6:
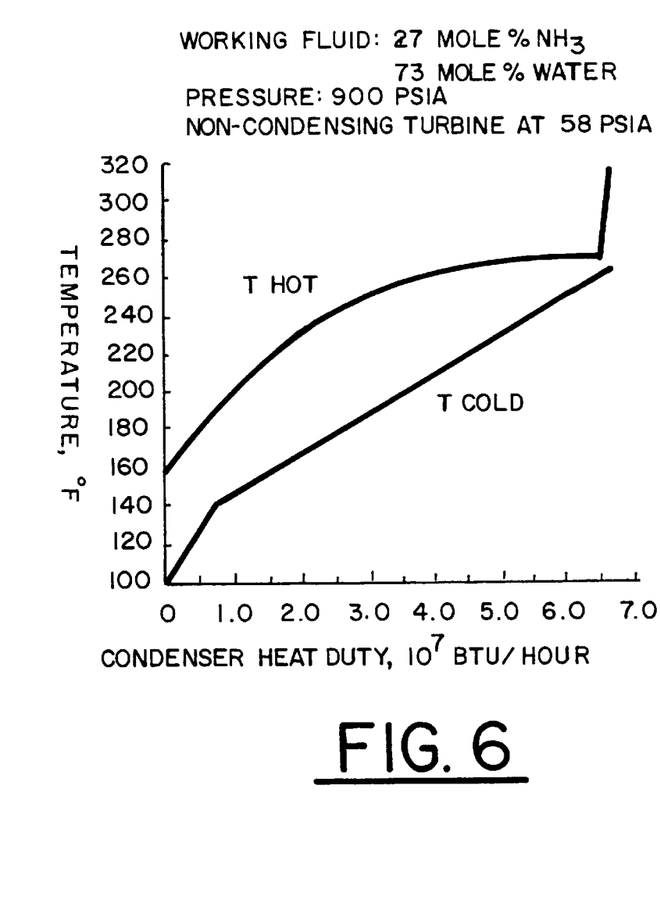
FIG. 6 is a graph showing the condenser temperature profiles for an integrated system using the same mixed ammonia-water working fluid as FIG. 5.

The temperature profiles of the heating and cooling streams in evaporator 225 are shown in FIG. 5, and profiles in condenser 245 are shown in FIG. 6. A comparison of the evaporator temperature profiles of FIGS. 3 and 5 shows that the mixed component working fluid results in a more efficient match of the heating and cooling curves than the single component working fluid. A comparison of the condenser temperature profiles of FIGS. 4 and 6 shows that the mixed component working fluid results in a much more efficient match of the heating and cooling curves than the single component working fluid. As a result of this improved match between the heating and cooling curves, the use of the mixed component working fluid allows heat to be transferred to and from the working fluid in a more reversible way with lower loss of usable work as increased entropy. Thus expansion turbine 239 generates 5,309 hp with the mixed component working fluid compared with 4,347 hp with the single component working fluid.

EXAMPLE 5

Process heat and material balances were computed for the ammonia plant of Examples 3 and 4 integrated with a heat recovery/expansion turbine system as shown FIG. 2. The heat recovery/expansion turbine system uses a mixed component working fluid containing 35 mole % ammonia and 65 mole % water, which is an adjustment of the composition of Example 4 to illustrate the effect of changing the working fluid composition. High temperature intermediate shift gas in line 223 is provided from the ammonia synthesis system at the same conditions as Examples 3 and 4, and evaporator 225 transfers the same 72.1 million BTU/hr to condensate 235 as in Examples 3 and 4. Vaporized mixed component fluid in line 237 at 785° F., 1,500 psia, and 69,300 lb/hr is expanded across six stage condensing turbine 239 to generate 5,858 hp to drive generator 241.

Turbine exhaust in line 243, produced at 277° F. and 70 psia, is condensed in condenser 245 to provide condensate in line 247 at 137° F. and 70 psia to pump 249. Pressurized condensate in line 251 is warmed in condenser 245 to provide condensate in line 235 at 263° F. and 1,510 psia. Condenser 245 provides 413,000 lb/hr of hot saturator feed water 211 at 263° F. and 400 psia with a condenser heat duty to saturator 209 of 57.9 million BTU/hr. Saturator makeup water in line 254 and pressurized cooled saturator discharge water in line 253 are provided at 173,000 and 240,000 lb/hr respectively as in Examples 3 and 4.

Figure 7:
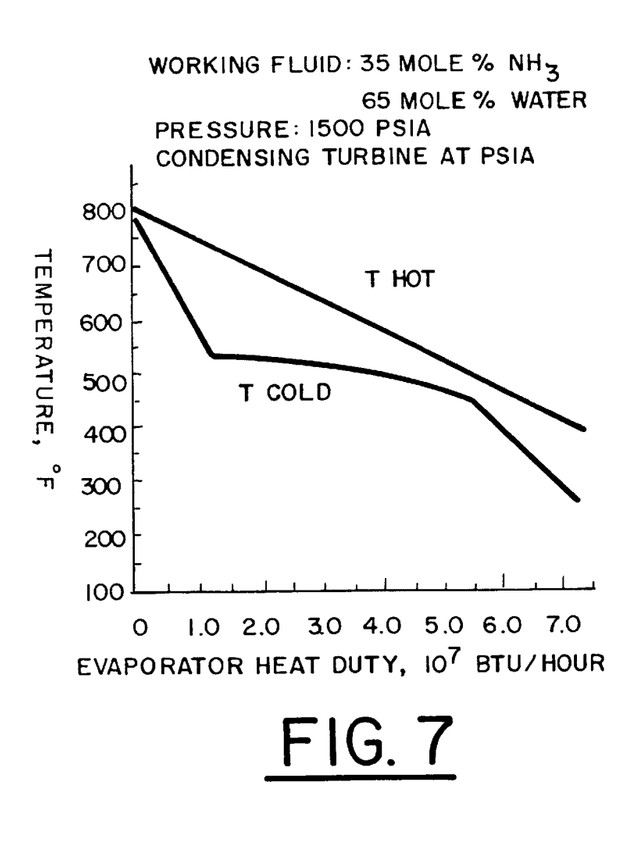
FIG. 7 is a graph of the evaporator temperature profiles for an integrated system using another mixed ammonia-water working fluid.
Figure 8:
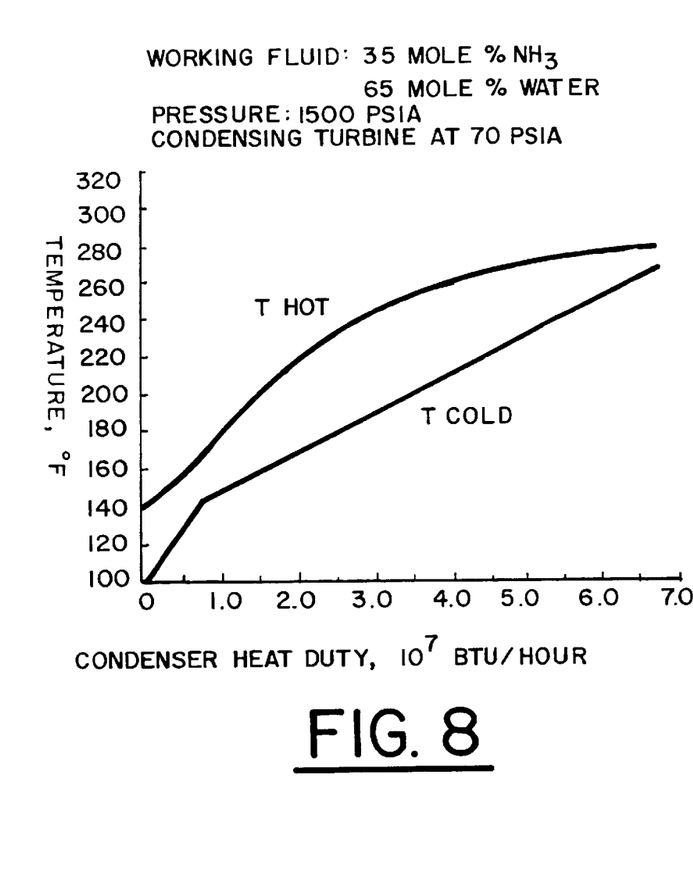
FIGS. 8 is a graph showing the condenser temperature profiles for an integrated system using the same mixed ammonia-water working fluid as FIG. 7.

The temperature profiles of the heating and cooling streams in evaporator 225 are shown in FIG. 7, and profiles in condenser 245 are shown in FIG. 8. A comparison of the evaporator temperature profiles of FIGS. 3 and 7 shows that the mixed component working fluid results in a more efficient match of the heating and cooling curves than the single component working fluid, similar to the comparison in Example 4 of FIGS. 3 and 5. A comparison of the condenser temperature profiles of FIGS. 4 and 8 shows that the mixed component working fluid results in a much more efficient match of the heating and cooling curves than the single component working fluid, similar to the comparison in Example 4 of FIGS. 4 and 6.

As a result of the different working fluid composition and higher operating pressure, expansion turbine 239 generates 5,858 hp compared with 5,309 hp in Example 4. Operation at the higher pressure will slightly increase capital cost, but the benefit is higher power recovery from the same amount of heat provided by high temperature intermediate shift gas in line 223.

A comparison of the results of Examples 3–5 is given in Table 1. Logarithmic mean temperature differences were calculated for evaporator 225 and condenser 245, and the relative power efficiency of each cycle were estimated.

TABLE 1

Comparison of Single Component and Mixed Component Working Fluids for Heat Recovery in an Ammonia Plant
(FIG. 2)

|  | Example 3 | Example 4 | Example 5 |
| --- | --- | --- | --- |
| Expansion turbine 239 pressures, psia |  |  |  |
| Inlet (line 237) | 505 | 900 | 1,500 |
| Outlet (line 243) | 52 | 58.5 | 70 |
| Log mean temperature difference, °F. |  |  |  |
| Condenser 245 | 58 | 38 | 36 |
| Evaporator 225 | 76 | 105 | 89 |
| Expansion turbine 239 output, hp | 4,347 | 5,309 | 5,858 |
| Relative cycle efficiency | 1.00 | 1.22 | 1.35 |

These Examples illustrate the cycle efficiency improvement realized by using a mixed component working fluid in recovering heat from a process stream in a higher temperature range, converting a portion of the heat to work, and rejecting the residual heat to a second process stream in a lower temperature range. This efficiency improvement is the direct result of close matches between the temperature profiles in the heat exchange between the process heat source stream and the working fluid, and between the process heat sink stream and the working fluid, over the entire temperature range of each heat exchange step.

Heat exchanger area is inversely proportional to the average log mean temperature difference driving force between the hot and cold streams in the exchanger. Close temperature pinches between the hot and cold streams in an exchanger, for example as exhibited by the single component working fluid shown in FIG. 3, adversely reduce this overall driving force and increase the area required for the heat exchange. With the more closely matched process and working fluid temperature profiles possible with mixed component working fluids, however, there is a more efficient use of heat exchanger area compared with single component working fluids.

In each of the embodiments of the invention described above, it is possible to control the composition of the mixed component working fluid during operation in order to maintain a constant outlet pressure and gas phase density in expansion turbine 239. This allows optimum operating efficiency of the expansion turbine despite changes in the temperatures of the high temperature process stream (heat source) and/or the low temperature process stream (heat sink). For example, in the process of FIG. 2, if the temperature of cooled saturator discharge water in line 253 or saturator makeup water in line 254 rises as a result of daily or seasonal changes in the ambient temperature, the concentration of the ammonia (which has a higher vapor pressure than water) in the mixed working fluid can be reduced to maintain the same equilibrium vapor pressure of the mixed working fluid at the higher temperature. Similarly, the concentration of the ammonia in the mixed working fluid can be increased to compensate for similar daily or seasonal decreases in the temperature of these two process streams.

This operational aspect of the invention is an improvement to the prior art. This improvement is based on the ability to adjust the composition of the working fluid during operation to control the response of expansion turbine 239 and condenser 245 to changing process conditions. The condenser pressure and exhaust pressure of a condensing turbine at a given temperature depend on the equilibrium vapor pressure of the working fluid. In a conventional system with a single component or a fixed composition mixed component working fluid, the phase rule dictates that the equilibrium vapor pressure must change in response to a change in temperature. With this invention however, the additional degree of freedom of working fluid composition allows any small to moderate change in condenser temperature to be compensated by a change in working fluid composition.

For example, assume that expansion turbine 239 operates at an optimum turbine exhaust pressure (and condenser inlet pressure) of 50 psia using a working fluid composition of 31 mole % $NH_3$ and 69 mole % $H_2O$. If process conditions change such that the working fluid temperature at the inlet to condenser 245 drops from 260° F. to 240° F., the working fluid composition can be adjusted to 53 mole % $NH_3$ and 47 mole % $H_2O$ to maintain the turbine exhaust pressure and condenser inlet pressure at 50 psia. Without this compositional adjustment, the pressure would have shifted from 50 psia to 35 psia, which would have forced the turbine to operate well away from its optimum exhaust pressure.

The invention can be included or retrofitted readily into an existing process plant such as a combined cycle power plant or an ammonia plant as described above. The invention can be included in any industrial process which has higher temperature and lower temperature process streams available as a heat source and a heat sink respectively. Since the preferred mixed component working fluid comprises ammonia and water, a standard steam gland sealing system could be used in the expansion turbine. In addition, this gland steam could be integrated into the working fluid composition control system. Also, the cycle is preferably operated at super-atmospheric pressure so oxygen from the atmosphere cannot easily leak into the cycle to contaminate the working fluid. Another advantage in the specific embodiments described herein is that ammonia is already present on the site for selective catalytic $NO_x$ reduction in many combustion-fired steam systems and is readily available in an ammonia synthesis plant.

Thus the invention described herein provides flexibility, improved efficiency, and increased power output from a system such as a chemical process heat integration/power generation system or an existing steam turbine power cycle at a minimum capital cost relative to the current practices of the prior art. The present invention provides integration of the heat sink of a power generation cycle with specific matching process stream heating requirements. The mixed component working fluid can receive or transmit heat of vaporization over a large temperature range (greater than 40° F.) to better match the heating and cooling curves of the relevant chemical process streams. The expansion turbine can operate at optimum efficiency at all times by maintaining a constant condenser pressure regardless of heat sink process stream temperature variations by adjusting the composition of the multi-component working fluid. In addition, the power generation efficiency in a power cycle can be further increased recycling some of its heat internally through preheating the high pressure liquid working fluid against the condensing low pressure working fluid vapor.

The essential characteristics of the present invention are described completely in the foregoing disclosure. One skilled in the art can understand the invention and make various modifications without departing from the basic spirit of the invention, and without deviating from the scope and equivalents of the claims which follow.

I claim:

1. A method of recovering work from a process having at least a first and a second process stream which comprises:

(1) transferring heat in a first heat exchange zone in a first temperature range from the first process stream to a selected working fluid comprising at least two components to yield a heated and pressurized vapor-containing working fluid at a first temperature and a cooled first process stream, wherein the selected working fluid has a given composition;

(2) work expanding the heated and pressurized vapor-containing working fluid in an expansion turbine to generate work, and withdrawing therefrom a cooled expanded working fluid;

(3) transferring heat from the cooled expanded working fluid to the second process stream in a second heat exchange zone in a second temperature range which is lower than the first temperature range, thereby heating the second process stream and condensing at least a portion of the cooled expanded working fluid to yield a condensate-containing working fluid;

(4) returning the condensate-containing working fluid to the first heat exchange zone to provide the selected working fluid of step (1); and (5) changing the given composition of the selected working fluid in response to a change in the first temperature range, a change in the second temperature range, or changes in both the first and second temperature ranges.

2. The method of claim 1 wherein the selected working fluid comprises two components, the first component of which has a higher vapor pressure than the second component.

3. The method of claim 2 wherein the given composition of the selected working fluid is changed in response to an increase in the second temperature range by decreasing the ratio of the first component to the second component.

4. The method of claim 2 wherein the given composition of the selected working fluid is changed in response to a decrease in the second temperature range by increasing the ratio of the first component to the second component.

5. The method of claim 1 wherein the selected working fluid comprises ammonia and water.

6. The method of claim 1 wherein the first process stream is cooled by at least 40° F. in step (1) in the first heat exchange zone.

7. The method of claim 1 wherein the first process stream is cooled from a temperature of less than 1000° F. to a temperature of greater than 20° F. in step (1) in the first heat exchange zone.

8. The method of claim 1 wherein the second process stream is heated by at least 40° F. in step (3) in the second heat exchange zone.

9. The method of claim 1 wherein the second process stream is heated from a temperature of greater than −60° F. to a temperature of less than 400° F. in step (3) in the second heat exchange zone.

10. The method of claim 1 wherein the process is a combined cycle power generation process in which heat is recovered from a gas turbine exhaust stream by vaporizing a water condensate stream by indirect heat exchange with the exhaust stream to generate steam, expanding the steam in one or more expansion turbines to drive an electric generator, withdrawing a cooled expanded water stream from a final expansion turbine, and condensing the cooled expanded water stream to provide a portion of the water condensate stream, and wherein the first process stream is the hot gas turbine exhaust stream and the second process stream is a portion of the water condensate stream.

11. The method of claim 10 wherein the pressure of the expansion turbine exhaust stream is controlled by changing the composition of the selected working fluid in response to changes to the second temperature range.

12. The method of claim 1 wherein the process is an ammonia synthesis process which comprises:

(a) heating and saturating a natural gas feed, wherein the natural gas feed is saturated by direct contact with a stream of hot saturator feed water to yield a stream of cooled saturator discharge water and a heated and saturated natural gas feed;

(b) subjecting the heated and saturated natural gas feed to primary reforming and secondary reforming steps to produce an intermediate synthesis gas comprising carbon monoxide and hydrogen;

(c) converting a portion of the carbon monoxide in the intermediate synthesis gas to hydrogen and carbon dioxide in a high temperature water-gas shift reactor to yield a high temperature intermediate shift gas; and (d) cooling the high temperature intermediate shift gas and introducing the resulting cooled gas into a low temperature water-gas shift reactor to yield raw ammonia synthesis gas which is further treated and reacted catalytically to yield an ammonia product;

wherein the first process stream is the high temperature intermediate shift gas and the second process stream is the cooled saturator discharge water.

\* \* \* \* \*